(12) United States Patent
Davidson et al.

(10) Patent No.: US 11,709,036 B2
(45) Date of Patent: Jul. 25, 2023

(54) RIFLESCOPE ADJUSTMENT SYSTEMS AND METHODS

(71) Applicant: GUNWERKS, LLC, Cody, WY (US)

(72) Inventors: Aaron Davidson, Burlington, WY (US); Haizhou Li, Austin, TX (US); Mark Delz, Buckholts, TX (US)

(73) Assignee: GUNWERKS, LLC, Cody, WY (US)

( * ) Notice: Subject to any disclaimer, the term of this patent is extended or adjusted under 35 U.S.C. 154(b) by 89 days.

(21) Appl. No.: 17/552,725

(22) Filed: Dec. 16, 2021

(65) Prior Publication Data

US 2023/0194205 A1 Jun. 22, 2023

(51) Int. Cl.
*F41G 1/38* (2006.01)
*G02B 23/16* (2006.01)

(52) U.S. Cl.
CPC .............. *F41G 1/38* (2013.01); *G02B 23/16* (2013.01)

(58) Field of Classification Search
CPC .................................. F41G 1/38; G02B 23/16
See application file for complete search history.

(56) References Cited

U.S. PATENT DOCUMENTS

| | | | |
|---|---|---|---|
| 6,862,832 B2 | 3/2005 | Barrett | |
| 7,538,544 B2 | 5/2009 | Lee | |
| 8,508,242 B2 | 8/2013 | Shao et al. | |
| 9,151,570 B2 * | 10/2015 | Plaster | F41G 1/38 |
| 11,428,503 B1 * | 8/2022 | Mauricio | F41G 1/38 |
| 11,530,900 B2 * | 12/2022 | Chou | G02B 27/36 |
| 11,629,932 B2 * | 4/2023 | Haag | F41G 1/38 42/122 |
| 2012/0186131 A1 * | 7/2012 | Windauer | F41G 1/38 42/122 |
| 2015/0247702 A1 * | 9/2015 | Davidson | F41G 1/473 42/122 |
| 2016/0040959 A1 * | 2/2016 | Davidson | F41G 1/38 42/122 |
| 2017/0241742 A1 * | 8/2017 | Davidson | H01M 50/213 |
| 2018/0313633 A1 * | 11/2018 | Delz | G02B 23/14 |
| 2018/0313939 A1 * | 11/2018 | Thomas | G02B 27/142 |
| 2019/0390938 A1 | 12/2019 | Thomas | |
| 2020/0166308 A1 * | 5/2020 | Chou | F41G 1/38 |

FOREIGN PATENT DOCUMENTS

| | | | | |
|---|---|---|---|---|
| DE | 202008008630 | * | 10/2008 | ............... F41G 1/38 |
| EP | 1340956 A2 | | 9/2003 | |
| EP | 1914520 A2 | | 4/2008 | |
| WO | 2018010908 A1 | | 1/2018 | |

* cited by examiner

*Primary Examiner* — Joshua E Freeman
(74) *Attorney, Agent, or Firm* — Dorsey & Whitney LLP

(57) ABSTRACT

An adjustment assembly for riflescopes and related methods are provided. In one example, an adjustment assembly includes a knob configured to rotate about an axis, a disc having a trace, a first sensor configured to measure a value relating to a particular portion of the trace, and a second sensor configured to sense complete revolutions of the knob about the axis. The riflescope also includes a processor configured to correlate the value with an angular displacement of the knob about the axis relative to a zero point.

20 Claims, 9 Drawing Sheets

RIFLESCOPE ADJUSTMENT SYSTEMS AND METHODS

BACKGROUND

Firearms such as rifles are used for a variety of purposes, including recreation, sport, and military or other protective services. Oftentimes, rifles are used to shoot targets at long distances (e.g., 100 yards or more) and even very long distances (e.g., in excess of 500 yards). In order to accommodate the sighting of a target at such distances, riflescopes are often employed. A riflescope includes optics that magnify the view of the target and also help to aim the rifle for purposes of accuracy and precision. For example, a riflescope may include a reticle or other aiming point positioned in the field of view that is provided by the optics of the riflescope, the aiming point being aligned with a target by a user prior to firing the rifle.

Factors such as bullet drop (i.e., the influence of gravity on a moving bullet), the Magnus effect, the Coriolis effect, ballistics specific considerations, as well as other factors may impact the path of a bullet when fired over relatively long distances. Thus, the ability to compensate for these factors by positioning the aiming point of the riflescope has been an important aspect in long range shooting.

Adjustment assemblies, such as elevation or windage turrets, may be used to alter the position of an aiming point so that a shooter may position the aiming point relative to the rifle in order to compensate for one or more of the above-described factors that affect the travel of a bullet during its flight toward the target. Determining the rotational position of a turret knob conventionally requires a user to remove their eye from the view of the riflescope view in order to review and interpret indicia markings on the turret knob.

There is a desire within the industry to provide enhanced optics that provide a user with an improved viewing experience including the provision of information relating to the state and performance of their optics device.

BRIEF SUMMARY OF THE INVENTION

Embodiments of the present disclosure provide optical devices, such as a riflescope, having one or more adjustment assemblies. The adjustment assemblies may be configured to determine a rotational position of one or more components of the assembly.

In accordance with some embodiment, an adjustment assembly for a riflescope is provided. The assembly comprises a knob, a disc, a first sensor, a second sensor, and a processor. The knob can define a central axis and rotate about the central axis. The disc has a trace having a characteristic which varies along a length of the trace. The first sensor can be configured to measure a value representative of the characteristic of the trace at a position along the length of the trace. The second sensor can be configured to detect complete revolutions of the knob about the central axis. The processor can be configured to correlate the value representative of the characteristic of the trace at the position with a partial revolution of the knob about the central axis relative to a zero point. The processor can be further configured to determine a displacement of an erector tube within the riflescope based on the complete revolutions and the partial revolution.

In some embodiments, the adjustment assembly can also include a linear actuator translatable along the central axis in response to rotation of the knob. The second sensor can detect a displacement of the linear actuator to sense the complete revolutions of the knob about the axis. The second sensor can include a magnetic sensor and the linear actuator can include a magnet.

In one embodiment, the first sensor can remain stationary while the disc is coupled to the knob and therefore rotates with the knob about the axis. Alternatively, this disc can remain stationary while the first sensor is coupled to the knob and rotates with the knob about the axis. The value representative of the defined characteristic of the trace at the position can be related to a detected change in an inductance, capacitance, or dielectric constant measured by the first sensor.

In one embodiment, the adjustment assembly further comprises a third sensor configured to measure a second value representative of the defined characteristic (e.g., the width) of the trace at a second position along the length of the trace. The processor can be further configured to correlate the first and second values with an angular displacement of the knob about the axis relative to a zero point.

In one embodiment, the first sensor can be configured to sense an angular displacement less than one revolution relative to the zero point. The length of the trace can extend continuously around the axis. The characteristic of the trace can be a width of the trace at the position. The trace can extend angularly along a surface of the disc.

In accordance with some embodiments, a riflescope is provided including an enclosure defining an internal volume, an erector tube pivotably disposed within the internal volume, a processor, and an adjustment assembly operable to displace the erector tube within the enclosure. The adjustment assembly can define a central axis. The adjustment assembly can comprise a knob, a disc having a metallic trace, a first sensor, and a second sensor. The knob can be rotatable about the central axis. A characteristic of the trace can vary along a length of the trace. The first sensor can be configured to measure a value representative of the characteristic of the trace at a position along the length of the trace. The second sensor can be configured to detect complete revolutions of the knob about the central axis. The processor can be configured to correlate the value representative of the characteristic of the trace at the position with a partial revolution of the knob about the central axis relative to a zero point. The processor can also be configured to determine a displacement of the erector tube within the enclosure based on the complete revolutions and the partial revolution.

In some embodiments, the second sensor is a magnetic sensor configured to detect a displacement of a magnet to detect the complete revolutions of the rotational component about the central axis. The disc can be coupled to the knob such that the disc rotates with the knob about the central axis. Alternatively, the first sensor can be coupled to the knob such that the first sensor rotates with the knob about the central axis. In some embodiments, the value representative of the characteristic of the trace at the position is related to a detected change in an inductance, capacitance, or dielectric constant measured by the first sensor.

In some embodiments, the adjustment assembly can include a third sensor configured to measure a second value representative of the characteristic of the trace at a second position along the length of the trace. The processor can be configured to correlate the first and second values with an angular displacement of the rotational component about the central axis relative to a zero point. The trace can extend continuously around the central axis in some embodiments. The characteristic of the trace can be a width of the trace at the position. The characteristic of the trace can be a radial position of the trace, relative to the central axis, at the position.

In accordance with some embodiments, a method for determining a displacement of an optical element of a riflescope is described herein. The method can comprise the step of providing a riflescope comprising a main body, an optical element disposed within the main body, a processor, and an adjustment assembly affixed to the main body. The adjustment assembly can comprise an actuator, a sensor, and a disc having a trace. A characteristic of the trace can vary along a length of the trace. The method can also comprise the step of rotating the adjustment assembly about an axis. The rotation can linearly displace the actuator and cause the optical element to displace an amount relative to the main body. The method can also comprise the step of measuring, using the sensor, a value representative of the characteristic. The value can correlate to a position along the length of the trace. The method can also comprise the step of correlating, using the processor, the value with an amount of rotational displacement of the adjustment assembly. The method can also comprise the step of determining, using the processor, the amount of displacement of the optical element at least partially based on the amount of rotational displacement of the adjustment assembly.

Features, components, steps or aspects of one embodiment described herein may be combined with features, components, steps or aspects of other embodiments without limitation.

BRIEF DESCRIPTION OF THE SEVERAL VIEWS OF THE DRAWINGS

The foregoing and other advantages of the invention will become apparent upon reading the following detailed description and upon reference to the drawings in which.

DETAILED DESCRIPTION OF THE INVENTION

Embodiments of an optical device, such as a riflescope, along with related components, systems, assemblies, and methods are provided herein. According to various embodiments, a riflescope may have one or more adjustment assemblies to determine or track the angular displacement of an erector tube within the riflescope. In certain embodiments, the adjustment assembly is configured to determine a number of complete revolutions a knob has made about a defined axis as well as any partial revolution made about the defined axis. Such an adjustment assembly can be, for example, a so-called windage turret or an elevational turret, although it may be incorporated into other assemblies as well.

Figure 1:
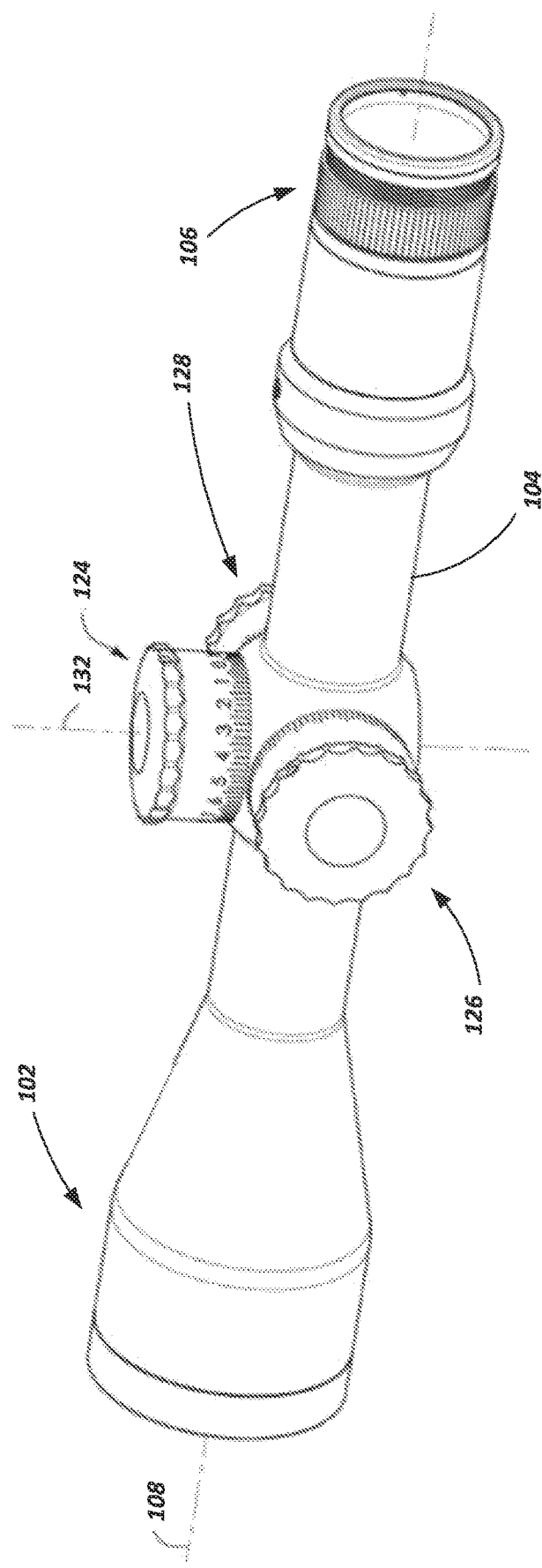
FIG. 1 is a perspective view of a riflescope according to an embodiment of the disclosure.
Figure 2:
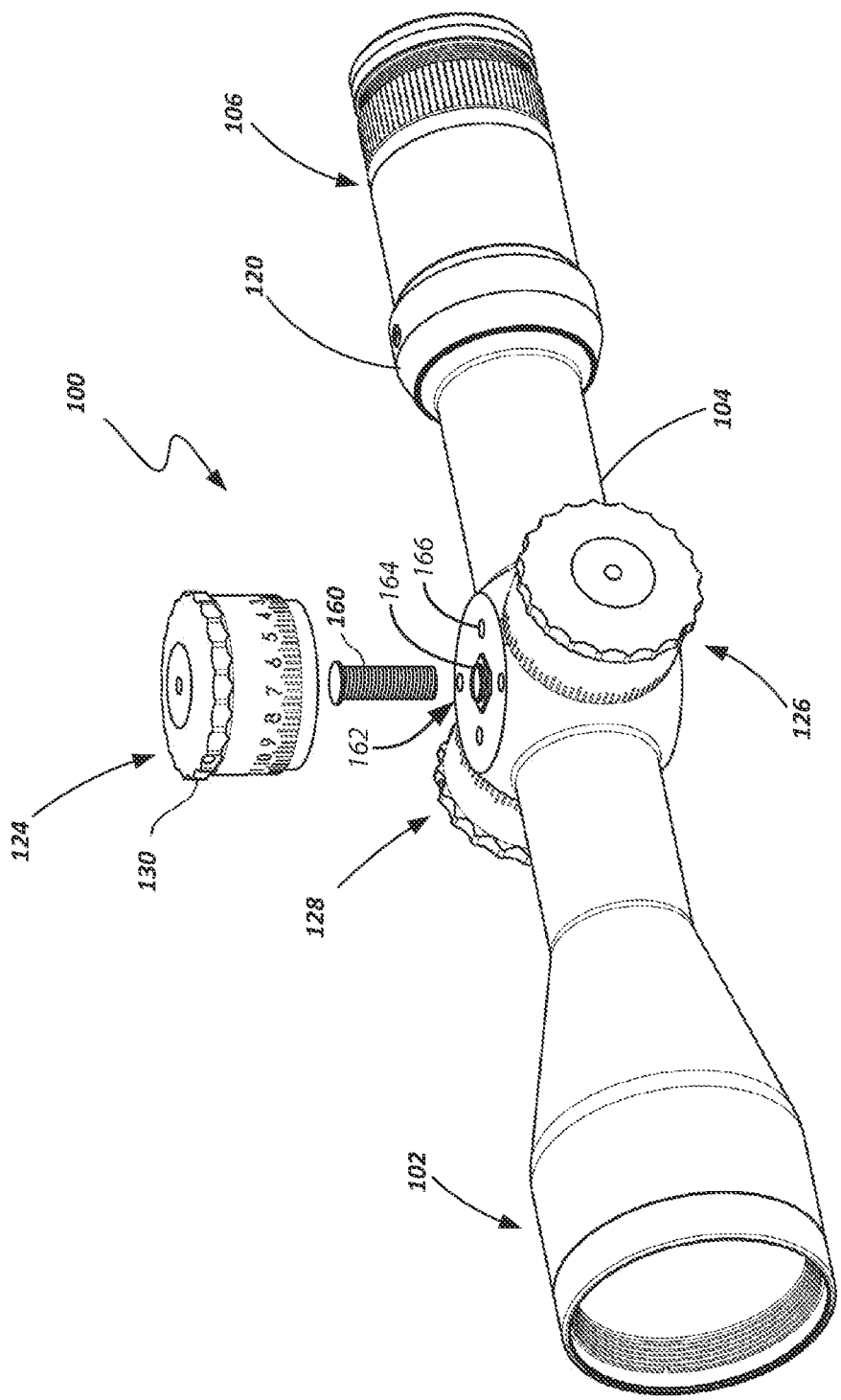
FIG. 2 is another perspective and partially exploded view of the riflescope shown in FIG. 1.
Figure 3:
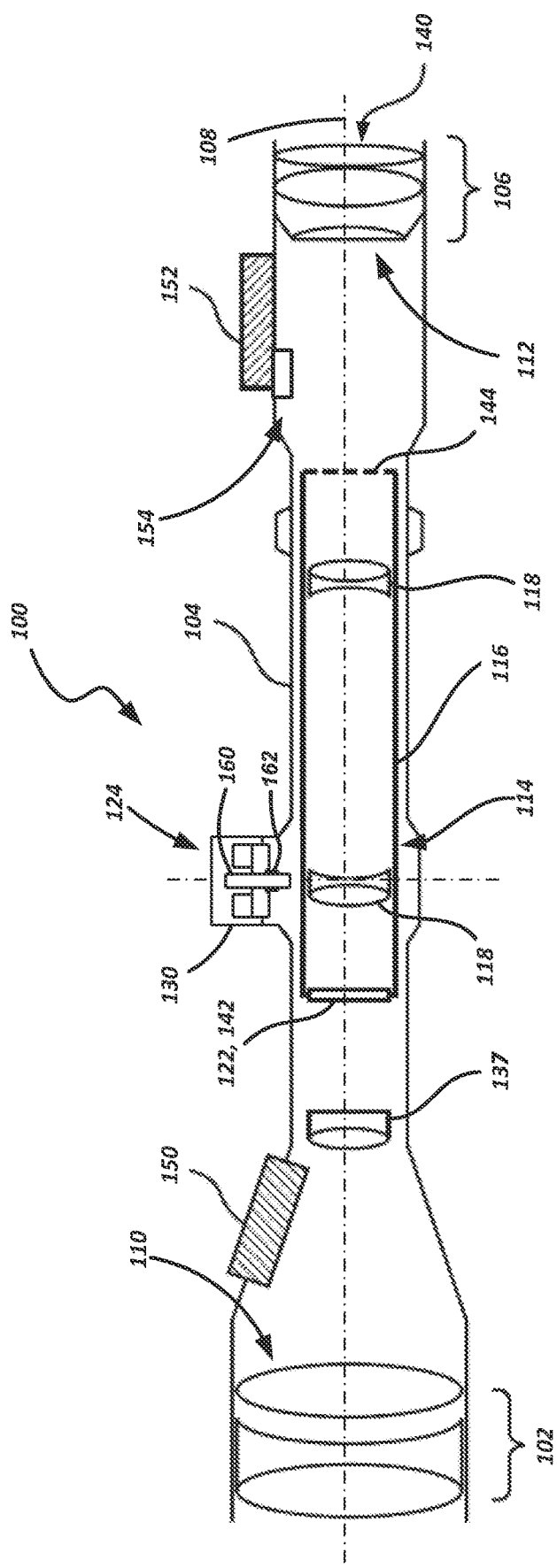
FIG. 3 is a schematic view of a riflescope illustrating the optics train according to an embodiment of the present disclosure.

Referring to FIGS. 1-3, a riflescope 100 is shown in accordance with an embodiment of the present disclosure. The riflescope 100 may include an objective system 102, a main tube 104, and an ocular system 106 arranged along an optical axis 108. The objective system 102 may include one or more lenses 110 and is positioned at the distal end of the riflescope 100 (i.e., the farthest away from a user's eye during use). The ocular system 106 also may include one or more lenses 112 and may be located at a proximal end of the riflescope 100. A plurality of optical elements may also be disposed within the main tube 104. For example, an erector system 114, including an erector tube 116 and various lenses or other optical elements 118, may be contained within the main tube 104 to invert the image so that a user sees the image in a "right side up" orientation when looking through the riflescope 100. A magnification ring 120 (also referred to as a power ring) may be used to vary the magnification of the image being viewed though riflescope by adjusting the relative position of various optical elements disposed within the riflescope 100.

In some embodiments, the target view seen through the riflescope 100 by a user (sometimes referred to as the "live view") may be overlaid with an image of a reticle 122 (e.g., a shape or pattern providing an aiming point within the user's view). In one embodiment, the reticle 122 may be placed within the first focal plane of the riflescope 100 (see, e.g., FIG. 3). The reticle 122 may be constructed from optical material, such as optical glass or plastic or similar transparent material, and/or may take the form of a disc or wafer with substantially parallel sides. The reticle 122 may, for example, be constructed from wire, nano-wires, an etching, or may be analog or digitally printed, or may be projected (for example, on a surface) by, for example, a mirror, video, holographic projection, prism, or other suitable means on one or more wafers of material. In some embodiments, the reticle 122 may include an illuminated reticle. An illuminated reticle may be etched into an optical surface, the etching being backfilled in with a reflective material such as, for example, titanium oxide, that illuminates when a light or diode powered by, for example, a battery, chemical, or photovoltaic source, is rheostatically switched on.

The riflescope 100 may also include a number of adjustment mechanisms including, for example, an elevation adjustment assembly 124, a parallax dial assembly 126, and a windage adjustment assembly 128. The elevation adjustment assembly 124, parallax dial assembly 126, and windage adjustment assembly 128 may each be referred to as turrets. The elevation adjustment assembly 124 may be used to adjust the vertical position of a reticle 122 within the body of the riflescope 100 by rotation of the associated knob 130 relative to the main tube 104 about a rotational axis 132 (see FIGS. 1 and 4) Likewise, the windage adjustment assembly 128 may be used to adjust the horizontal position of reticle 122 within the body of the riflescope by rotation of an associated knob 134 relative to the main tube 104 about a rotational axis 136 (see FIG. 1). The parallax dial assembly 126 may be used to adjust target focus and/or correct parallax (e.g., such as by repositioning a focus lens 137) by rotation about the rotational axis 132. The optical axis 108 and the two rotational axes 132 and 136 may be oriented orthogonally with respect to each other (see FIGS. 1 and 3).

The ocular system 106 may include an eyepiece 140 through which the user may view a target through the riflescope 100. In some embodiments, the ocular system 106 may be adjusted to correct for the user's vision (sometimes referred to as a diopter adjustment). For example, the ocular system 106, or a portion thereof, may be rotated or adjusted relative to the main tube 104 to change the focus of the riflescope 100. In some embodiments, once adjusted, the ocular system 106 (or adjusted portion thereof) may be locked into place with a locking ring or other mechanism.

The various optical elements (e.g., lenses associated the objective system 102, the focus lens 136 and the erector system 114) may be arranged to provide a first focal plane 142 and a second focal plane 144 (see FIG. 3). In other words, light rays may converge to provide an "in focus" image at the focal planes 142, 144. Conventionally, the image at the first focal plane 142 may be vertically inverted due to the arrangement of lenses in the objective system 102, and the image at the second focal plane 144 may be in an "upright" or non-vertically-inverted orientation, i.e., an orientation that a user would expect to see the target with the naked eye and without the aid of the riflescope 100.

As shown in FIG. 3, the riflescope 100 may also include various electronic components. For example, the riflescope 100 may include a battery 150 and a control module 152 (or computational system) which may include, among other things, a processor and memory. A display system 154 may be in communication with, or otherwise associated with, the control module 152. In some embodiments, the battery 150 and the control module 152 may be enclosed within the housing or body of the riflescope. In some embodiments, the battery 150 and/or the control module 152 can be enclosed within a cavity defined by one of the turrets (e.g., parallax dial assembly 126). In some embodiments, the battery 150 and/or the control module 152 may be coupled to an exterior portion of the riflescope 100. Additionally, while these components are schematically shown as being located at certain positions in FIG. 3 (i.e., with the battery shown near the objective system 102 and the control module 152 near the ocular system 106), such should not be considered limiting. Rather, the electronic components may be positioned at a variety of locations and may be incorporated in a variety of designs or configurations. For example, in one embodiment, the battery may be housed in a lever associated with a rotatable ring (e.g., the magnification ring 120) such as is described in U.S. Patent Publication No. 2017/0241742 entitled GUN SCOPE WITH BATTERY COMPARTMENT and published on Aug. 24, 2017, the entire disclosure of which is hereby incorporated by reference.

Various other electronic components may also be incorporated with or utilized in conjunction with the riflescope including, for example, various sensors, communications devices, input/output devices, etc. Non-limiting examples of electronic components and systems incorporated into or otherwise utilized with a riflescope are described in U.S. Patent Publication No. 2015/0247702, entitled FEEDBACK DISPLAY FOR RIFLESCOPE published Sept. 3, 2015, and U.S. Patent Publication No. 2019/0390938, entitled RIFLESCOPE WITH FEEDBACK DISPLAY AND RELATED METHODS and published Dec. 26, 2019, the disclosures of which are hereby incorporated by reference in their entireties.

During use of the riflescope 100, the control module 152 may monitor one or more components of the riflescope, and/or one or more environmental parameters, and report the determined status of these components and parameters through the display system 154 to the user. This may enable the user to obtain the information provided by the control module 152 without having to remove their eye from the view through the riflescope 100 as presented through the eyepiece 140. Examples of display systems that may be used are described in the previously incorporated U.S. Patent Publication Nos. 2015/0247702 and 2019/0390938.

Referring again to FIG. 2, a partially exploded view of the elevation adjustment assembly 124 is shown, revealing a bolt or an actuator 160 of the adjustment assembly that is configured such that a portion of the actuator 160 is received within a coupler 162 positioned on the top of the riflescope 100. In one embodiment, an opening 164 within the coupler 162, shown in FIG. 2, may be generally circular in cross-sectional geometry for receipt of a portion of the actuator 160. Thus, the actuator 160 may be a component that linearly translates along the rotational axis 132 of the elevation adjustment assembly 124 and also rotate about the axis 132. While the opening 164 is shown as being circular, other shapes, geometries, and configurations may also be implemented instead of, or in addition to, a circle. For example, the opening 164 may be generally rectangular in cross-sectional geometry, providing a keyed engagement with a similarly shaped portion of the actuator 160. Thus, in such an embodiment, the actuator 160 may translate along the rotational axis 132 of the elevation adjustment assembly 124, but may not rotate about the axis 132 (see FIGS. 3 and 4).

As shown in FIG. 3, the actuator 160 is also shown schematically configured to linearly translate relative to the opening 164 and engage the erector tube 116. As previously noted, rotation of knob 130 about axis 132 may cause actuator 160 to translate or move linearly along axis 132, the actuator 160 thereby becoming displaced relative to the body of the riflescope 100 (e.g., relative to the main tube 104). This translational movement of actuator 160 may cause erector tube 116 and associated optical elements 118 to also move within the body of the riflescope 100. Movement of erector system 114 within its allowed adjustment range causes a displacement of the aiming point (e.g., the reticle 122) within the riflescope 100. For example, an angular position of the erector tube 116 relative to the body of the riflescope 100 can be displaced or altered as the actuator 160 translates. This angular displacement of the erector tube 116 can be correlated to an angular measurement (e.g., a minute of angle (MOA)) that the erector tube 116 is displaced relative to the body of the riflescope 100. A similar arrangement may be used with other adjustment assemblies such as the windage adjustment assembly 128.

In embodiments, the adjustment assemblies may be configured such that the knobs (e.g., knobs 130 and 134) may include external markings that indicate the rotational position of knob relative to the riflescope 100. These markings may include, for example, hash marks, dots, post points, numbers, or other indicia (see, e.g., FIGS. 1-2). Additionally, the markings may include a "zero-mark" that may correspond to a specific point of aim configuration inside the riflescope 100. In some embodiments, considering the elevation assembly 124 as an example, the zero-mark may be at the lowest or a relatively low position and, when the knob 130 is rotated to the zero-mark, the knob 130 may be prevented from rotating any further in one direction. The markings may be associated with a particular unit of measure such as minute of angle (MOA) or a milliradian (MIL). Each marking may be configured to correspond to a specific amount of incremental angular adjustment of the erector tube 116 (e.g., each marking may represent ⅛MOA, ¼MOA or ½MOA or other appropriate increments).

In some embodiments, the adjustment assemblies may be configured to "click" or have a positive positioning at each marking (e.g., such as by use of a detent or similar mechanism in the adjustment assembly). In other words, the adjustment assemblies may snap into a unique rotational position when each incremental adjustment is reached such that a predetermined rotational force or must be applied to the knob in order to rotate the adjustment assemblies from one rotated position to the next. Thus, it is common, for example, to refer to the rotation of a knob through an increment of a single marking as "one click," or through four incremental markings as "four clicks," and so on. In other embodiments, the positioning of the knobs of the adjustment assemblies may depend on friction resistance, without a positive "click" or tactile bump to hold the knob in a desired rotational position.

Figure 4:
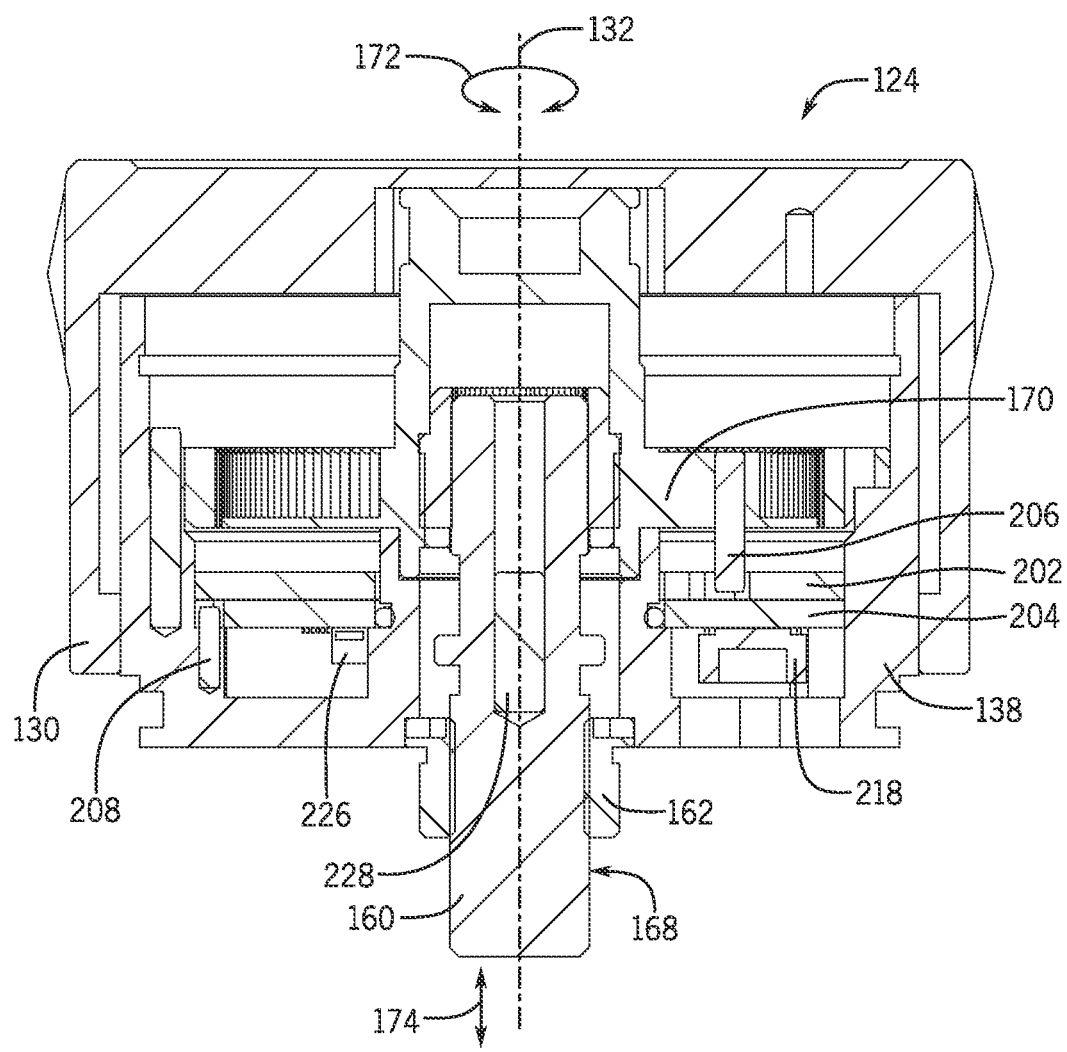
FIG. 4 is a partial cross-section of an adjustment assembly of a riflescope according to an embodiment of the present disclosure.
Figure 5:
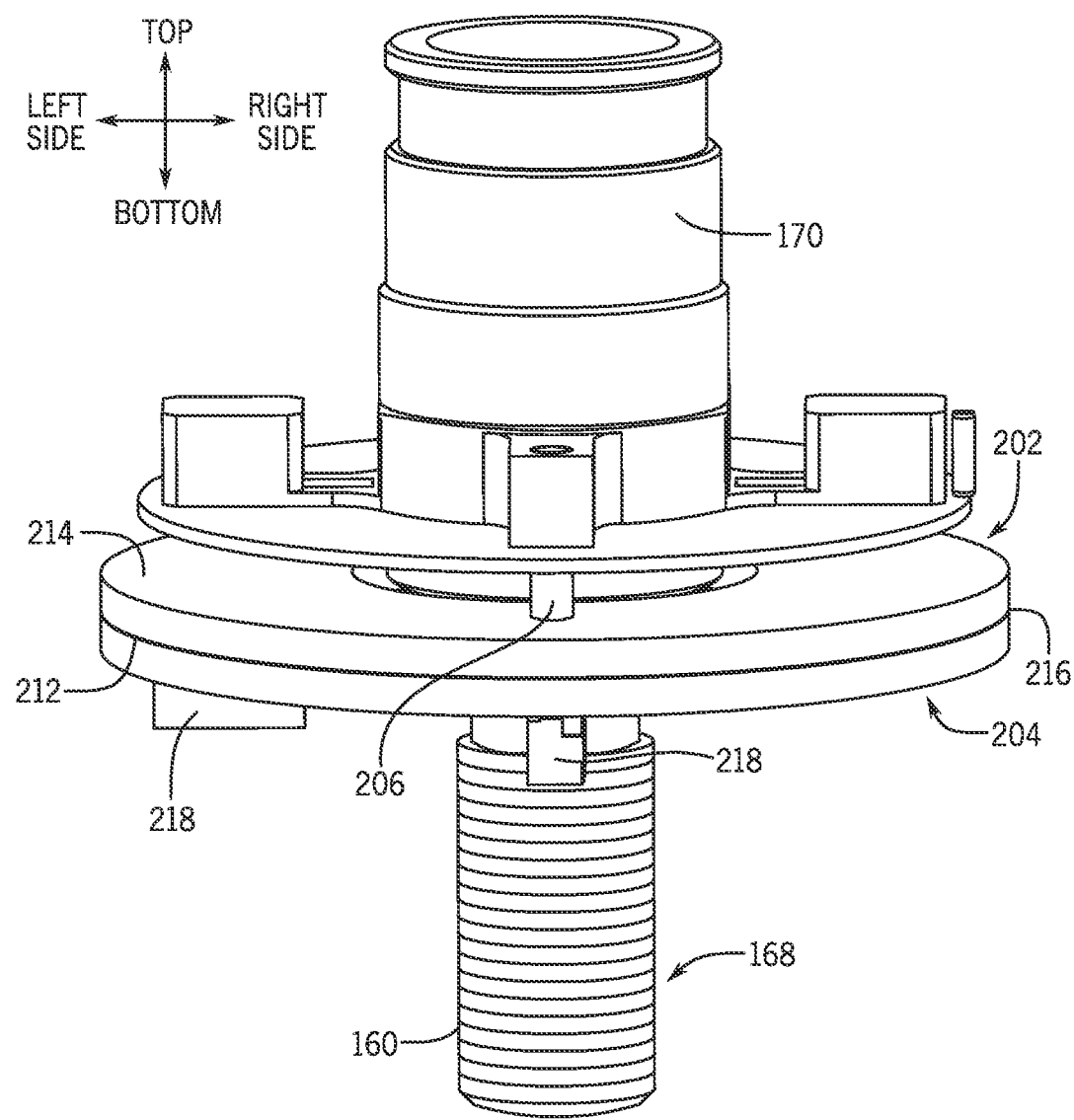
FIG. 5 is a perspective view of various components of an adjustment assembly of a riflescope according to an embodiment of the present disclosure.

Referring now to FIG. 4, a partial cross-sectional view is provided of an elevation adjustment assembly 124 according to one embodiment of the disclosure. The assembly 124 includes the knob 130, which may serve as a housing for, or generally enclose, many of the other components of the assembly 124. The assembly 124 may further include a base 138 and a nut 170, which may be rotatably coupled with the knob 130. The base 138 can be rigidly coupled to the top of the riflescope 100, for example, by way of one or more fasteners extended through the base and received within respective apertures 166 within the riflescope 100 (see FIG. 2). In one embodiment, the nut 170 may be selectively coupled to the knob 130 so that, when coupled, the two components rotate together about axis 132, but when decoupled or "disengaged", the knob 130 may rotate about the axis 132 without concurrently rotating the nut 170. Such decoupling or disengaging may be used, for example, to "zero" the knob 130 of the adjustment assembly 124. Such selective coupling and decoupling of the knob 130 from the nut 170 may be accomplished, for example, using a set screw or some other coupling mechanism.

With continued reference to FIG. 4, the elevation adjustment assembly 124 may further include the actuator 160. The actuator 160 may include a threaded portion 168 which engages mating threads formed in the coupler 162. The actuator 160 may be configured such that, when the nut 170 rotates about the axis 132 as indicated by directional arrow 172, the actuator 160 is translated or displaced along the axis 132 as indicated by directional arrow 174. In some embodiments, the adjustment assembly 124 further includes one or more devices for determining and/or tracking relative positions of various components of the adjustment assembly 124. For example, as explained in detail herein, one or more discs may be used to determine the rotational position of the nut 170 relative to the base 138 (or other component) and/or the linear position of the actuator 160 relative to the base 138 (or other component). While the one or more discs are illustrated as circular or round, the one or more discs can be rectangular, triangular, square, oval, or any other geometric or non-geometric shape.

Referring now to FIGS. 4-7, in one embodiment, the adjustment assembly 124 may include a first disc 202 and a second disc 204. The first and second discs 202, 204 may be coaxially arranged or positioned relative to each other. For example, the first disc 202 and the second disc 204 can be positioned directly adjacent one another such that a bottom surface 212 of the first disc 202 faces a top surface of the second disc 204. In some embodiments, either or both of the first and second discs 202, 204 can include a printed circuit board (PCB). A barrier or intermediate component can be placed between the first disc 202 and the second disc 204. For example, a sheet of Teflon can be placed between the first and second discs 202, 204 to inhibit or prevent the first disc 202 from contacting the second disc 204 (and vice versa) and to reduce friction between the two discs. In some embodiments, an air gap may be formed between the first and second discs 202, 204. While the first disc 202 and the second disc 204 are illustrated as circular or round, one or both of the first disc 202 and second disc 204 can be rectangular, triangular, square, oval, or any other geometric or non-geometric shape.

In some embodiments, the first disc 202 can be coupled to the nut 170 (e.g., via one or more pins 206) and configured to rotate concurrently and concomitantly with the nut 170 about the axis 132. In some embodiments, the second disc 204 can be coupled to base 138 (e.g., via pin 208) and therefore remain stationary as the nut 170 is rotated about the axis 132. In other embodiments, the first disc 202 can be coupled to the base 138 while the second disc 204 is coupled to the nut 170. Although FIGS. 4-7 depict components of the elevation adjustment assembly 124, the teachings of these figures and their related descriptions herein may be similarly applied in a parallax dial assembly 126 and/or a windage adjustment assembly 128 in association with the adjustment of the either those assemblies 126 or 128 relative to their associated rotational axes.

With the first disc 202 being coupled with the nut 170, if the nut 170 is rotated about its central rotation axis 132 through an angle of 15 degrees, the first disc 202 likewise rotates through an angle of 15 degrees about the axis 132. The same holds for any other angle of rotation of the nut 170 (e.g., a 359 degree rotation of the nut 170 results in a corresponding 359 degree rotation of the first disc 202). It is also noted that the first disc 202 may be configured such that rotation of the nut 170 in either direction (i.e., either clockwise or counterclockwise) about the axis 132 results in a corresponding rotation of the first disc 202.

The first disc 202 can include a metallic trace or other conductive regions (shown in FIGS. 7A-E) positioned circumferentially about the axis 132. For example, the metallic trace (e.g., metallic trace 210 of FIG. 7A) can extend circumferentially around the axis 132 to form a continuous unbroken metallic layer on the first disc 202. The metallic trace can be partially or wholly made of any conductive or semi-conductive materials. In some embodiments, the metallic trace can extend a circumferential length (see length L of FIGS. 7A-D) on a surface of the first disc 202. For example, the metallic trace can be positioned on a bottom surface 212 of the first disc 202 such that it faces the second disc 204. While the trace is described above as metallic, in other examples, the trace can include a non-conductive material such as a polymer or can otherwise be defined by a recess or cutout.

It is noted that, use of the term "circumferentially" with respect to various traces or conductive elements disposed on a surface of a disc (e.g., 202 or 204) does not require that the traces or conductive elements be placed at the outer perimeter of the associated disc. Rather, such use of the term circumferential generally indicates an arcuate path that extends around or circumscribes an associated axis (e.g., rotational axis 132) wherein the pathway may lie entirely or partially on or within the outer circumference or outer perimeter of the disc. Additionally, each point of the circumferential path need not be at the same distance or radius from the rotational axis (e.g., axis 132).

A width (or other characteristic) of the metallic trace can vary along the length of the metallic trace as will be described in further detail below. As also described below with reference to FIGS. 7A-E, the metallic trace can be formed using a conductive material having a multitude of shapes, lengths, and sizes. Although the metallic trace is depicted as being positioned on the bottom surface 212, it should be appreciated that the metallic trace can be positioned on one or more surfaces of the first disc 202 (e.g., bottom surface 212, top surface 214, and side surfaces 216).

Figure 6:
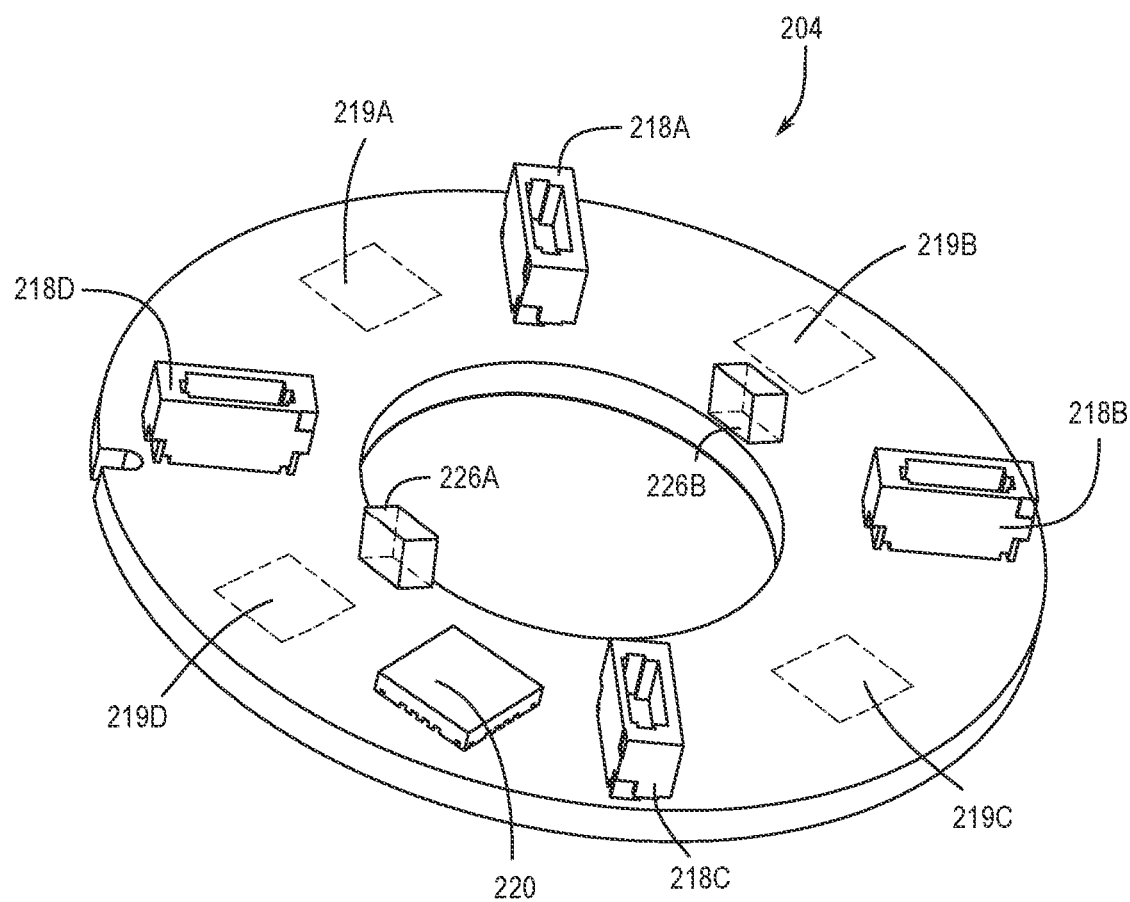
FIG. 6 is a bottom perspective view of a disc of an adjustment assembly according to an embodiment of the present disclosure.

As depicted in FIG. 6, the second disc 204 may include various electronic components including, for example, one or more sensors 218A-218D and a converter 220. The one or more sensors 218A-218D, the converter 220, and/or other electronic components may be cooperatively configured to determine the rotational position of the first disc 202 relative to second disc 204 and, therefore, relative to the base 138. In some embodiments, the rotational position can be determined based on a measured value representative of the width (or other known characteristic) of the metallic trace at a position along the length of the metallic trace.

In some examples, the second disc 204 can include more than one sensor 218A, such as, between two and five sensors to form a sensor bridge which more accurately and consistently detects the position of the second disc 204 relative to the first disc 202. For example, one or more negative effects of ambient conditions (e.g., temperature, elevation, humidity, pressure, etc.) can be limited or inhibited using a plurality of sensors 218A-218D. Additionally, or alternatively, independent measurements/data detected by each sensor of the plurality of sensors can be averaged, weighted, or otherwise correlated with one or more measurements/data detected by the other sensors of the plurality of sensors to provide a more accurate determination of the position of the second disc 204 relative to the first disc 202 (i.e., an amount the adjustment assembly 124 has been rotated relative to the main tube 104 of the riflescope 100).

In some examples, the one or more sensors 218A-218D and/or converter 220 can form part of a circuit having one or more inductors 219A-219D that produces one or more magnetic fields when exposed to an electrical current. The metallic trace of the first disc 202 can act as a conductor, which reacts to the magnetic fields in a manner that correlates to the relative to the width of the metallic trace being exposed to the magnetic fields. When the metallic trace is positioned near the one or more inductors 219A-219D, the magnetic fields induce eddy currents on the surface of the metallic trace. These eddy currents generate opposing magnetic fields that weaken the magnetic fields produced by the one or more inductors 219A-219D in a measurable way. For example, the opposing magnetic fields can reduce the inductance of the circuit (e.g., sensors 218A-218D, other circuit components, and/or the converter 220), which is detectable as a shift in resonance or energy loss in the circuit. In some examples, one or more of the inductors 219A-219D can be formed within the second disc 204 (e.g., formed as one or more metal coils within the second disc 204 during manufacturing of the second disc 204).

A portion of the metallic trace having a relatively narrower width will generate relatively weaker opposing magnetic fields due to a lesser surface area defined, at least partially, by the narrow width. A narrower width therefore has a reduced effect on the one or more inductors' 219A-219D respective magnetic fields. Conversely, a portion of the metallic trace having a relatively broader width will generate relatively stronger opposing magnetic fields due to a greater surface area partially defined by the broader width.

A broader width can therefore have a greater effect on the inductors' 219A-219D respective magnetic fields. Thus, the width of the metallic trace positioned adjacent the one or more inductors 219A-219D can be correlated to the effect that the metallic layer has on a measurable characteristic of the circuit (e.g., a measurable reduction of inductance).

Additionally, or alternatively, the principles described herein relating to inductance could also be implemented using another electrical or electromagnetic characteristic, such as, capacitance or a dielectric constant. For example, the one or more inductors 219A-219D could also be partially or wholly substituted for one or more capacitors or electronic components disposed on or within the second disc 204 and generate capacitance. The operational parameters of these one or more capacitors can be uniquely altered or manipulated by a portion of the metallic trace having a characteristic (e.g., width, location, etc.) that varies along the length of the metallic trace, such that, the rotational position of the first disc 202 relative to the second disc 204 can be deduced.

When the nut 170 is rotated from one position to another (i.e., angularly displaced about axis 132), the first disc 202 is likewise rotated relative to the second disc 204. As the first disc 202 rotates relative to the second disc 204, the metallic trace also rotates such that a unique portion of the metallic trace having a distinct width (or other characteristic) is positioned near or adjacent the one or more sensors 218A-218D. The one or more sensors 218A-218D of the second disc 204 can measure or determine a value that is representative of the distinct width (or other characteristic) of the metallic trace of the first disc 202 at a given position along the length of the metallic trace. The converter 220 can convert the characteristic of the circuit measured by the one or more sensors 218A-218D (e.g., capacitance, inductance, etc.) to a digital signal. The digital signal can be communicated or transferred to one or more processors (e.g., control module 152) disposed within the riflescope. The processor can correlate the measured value to a specified characteristic of the trace (e.g., its width and the location of the sensed width along the length of the trace), thereby determining the rotational position of the first disc 202 and, thus, the rotational position of the nut 170. While the rotational position (i.e., angular displacement) of the first disc 202 is described herein with reference to the width of the metallic trace, it should be appreciated that the position of the first disc 202 can also be determined without explicitly referencing the width of the metallic trace. For example, a detected radial position of the metallic trace on the first disc 202 relative to the rotational axis 132 (or some other characteristic of the trace) can be utilized to determine the position of the first disc 202 (see FIG. 7C).

Figure 7A:
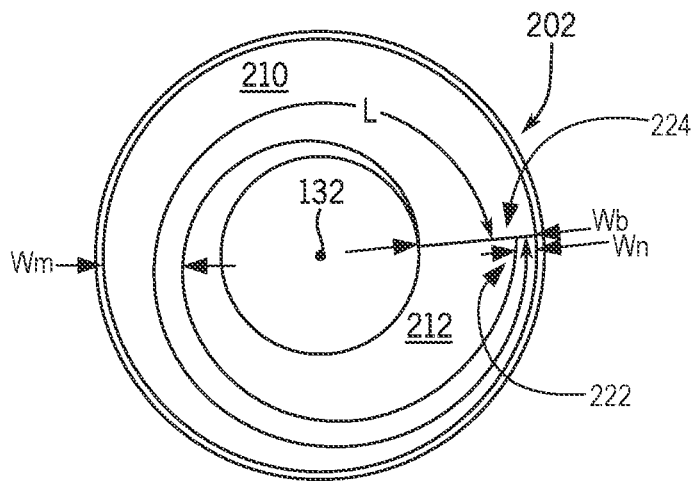
FIG. 7A-E are top views of a disc having a metallic trace according to embodiments of the present disclosure.

Referring now to FIG. 7A, an embodiment of the first disc 202 having a metallic trace 210 positioned on a surface 212 of the first disc 202 is shown. The metallic trace 210 shown in FIG. 7A extends along an arcuate path, referred to herein as a circumferential length L, on the surface 212 of the disc and about the rotational axis 132. A first end 222 of the metallic trace 210 can define a narrow width (referred to herein as $W_N$) with the width of the trace 210 broadening at a known rate (e.g., a constant rate) along the length L of the metallic trace 210. The metallic trace 210 can terminate at a second end 224 having a broad width (referred to herein as $W_B$). Because the width of the metallic trace 210 varies at a known rate along the length L, a sensor can measure a value representative of the width that correlates to the angular displacement of the first disc 202 relative to the base 138. For example, the first disc 202 can be angularly displaced (i.e., rotated) until a width positioned midway (referred to as $W_M$ herein) between the first and second ends 222, 224 of the metallic trace 210, is positioned adjacent or near one or more sensors 218A-218D of the second disc 204. The one or more sensors 218A-218D can measure a value (e.g., impedance, inductance, dielectric constant, etc.) representative of the width $W_M$ of the trace 210 that is immediately adjacent the one or more sensors 218A-218D. The processor can correlate this value with an angular displacement of 180 degrees because the width $W_M$ is positioned halfway between the first and second ends 222, 224 of the metallic trace 210. Because the width of the metallic trace 210 varies at a known rate along its length L, the width of the metallic trace 210 correlating to each degree of angular displacement or rotation is distinct and can therefore be utilized to determine the angular displacement of the first disc 202 relative to the base 138 at any position generally between 0 degrees and 360 degrees. It is noted that, in various embodiments, the angular position or offset from a zero point may be expressed as a positive or negative angular displacement value.

Figure 7B:
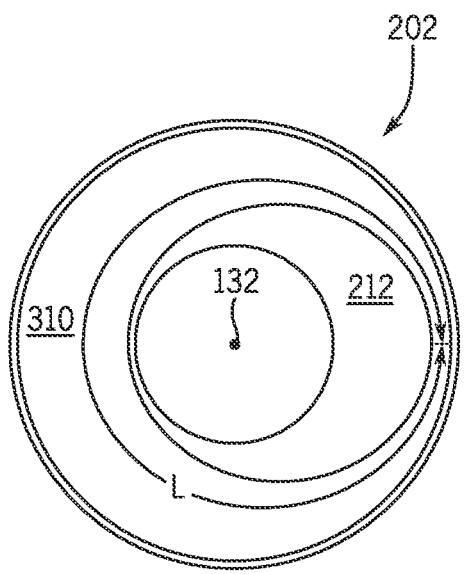

FIG. 7B depicts another embodiment of the first disc 202 having a metallic trace 310 positioned on a surface 212 of the first disc 202. The metallic trace 310 shown in FIG. 7B extends a circumferential length L about the rotational axis 132 along a surface 212 of the first disc 202. The width of the metallic trace 310 increases at a known rate (e.g., at a constant rate) until halfway through the length L and then decreases at a known rate (e.g., at the same rate) thereafter. Thus, in viewing FIG. 7B, the trace 310 could be said to be symmetric about a horizontal axis extending through the rotational axis 132. A set of sensors 218 can be positioned on the second disc 204 to determine the angular displacement of the first disc 202 relative to the base 138. For example, each sensor of the one or more sensors 218A-218D can measure a value representative of the width of the metallic trace 310 positioned near or adjacent the respective sensor. Thereafter, the values representative of each respective width can be compared to determine the position of the metallic trace 310 relative to each sensor 218A-218D, and thereby determine the angular displacement of the first disc 202 relative to the base 138 based on the unique combination of the measured widths. Any of the embodiments shown in FIG. 7A-7E can use a single sensor (e.g., sensor 218A) to determine the position of the first disc 202 relative to the second disc 204 or may use two or more sensors (e.g., a combination of the sensors 218A-218D) to determine the rotational position of the first disc 202 relative to the second disc 204.

Figure 7C:
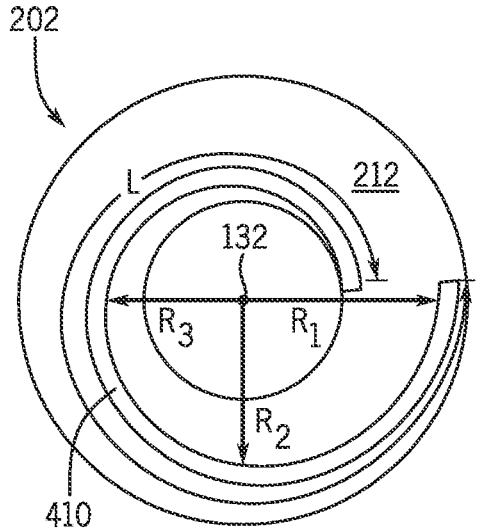

FIG. 7C depicts yet another embodiment of the first disc 202 having a metallic trace 410 positioned on a surface 212 of the first disc 202. In contrast to the metallic traces depicted in FIGS. 7A and 7B, the metallic trace 410 shown in FIG. 7C has a uniform width along its length L. In the embodiment shown in FIG. 7C, the radial position of a particular portion of the metallic trace 410 on the first disc 202, relative to the axis of rotation 132, can be utilized to determine the angular displacement of the first disc 202. In other words, the radial position of the metallic trace 410 relative to the axis 132 may be distinct at each location along the length L of the metallic trace 410, and one or more sensors 218A-218D, positioned on the second disc 204, can be configured to detect the radial position of the portion the metallic trace 410 relative to the axis 132 and thereby determine a rotational position of the first disc 202.

For example, the first disc 202 can be rotated such that the portion of the metallic trace 410 positioned at a radius $R_2$ from the axis 132 is positioned near or adjacent a sensor (e.g., one or more of the sensors 218A-218D) on the second disc 204. The sensor can be configured to detect the portion of the metallic trace 410 is positioned at a radius $R_2$ from the axis 132. In this example, the radius $R_2$ can be correlated to an angular displacement of 90 degrees relative to a specified zero point. In another example, the first disc 202 can be rotated such that a sensor on the second disc 204 detects the portion of the metallic trace 410 positioned at a radius $R_3$ from the axis 132, which would correlate to an angular displacement of 180 degrees relative to the zero point. Thus, the trace 410 may produce a different impedance, inductance, capacitance, dielectric constant, or other electrical or electromagnetic effects when the portion of the electrical trace 410 associated with radius $R_1$ is positioned adjacent a sensor as compared to when the portion of the electrical trace 410 associated with radius $R_2$ or $R_3$ are positioned adjacent a sensor due to their unique radial positions.

Figure 7D:
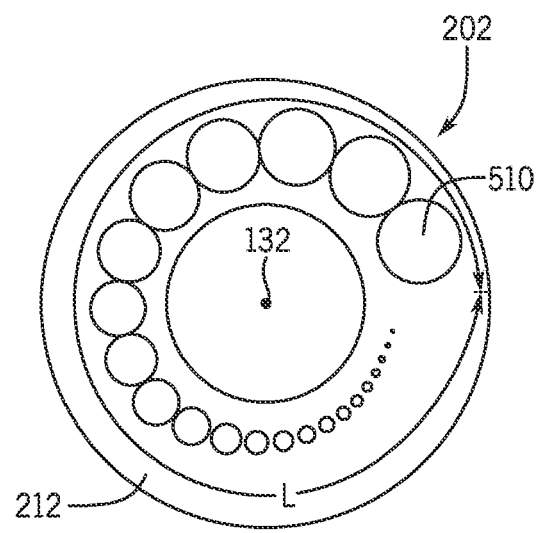

FIG. 7D depicts a further embodiment of the first disc 202 having a metallic trace 510 positioned on a surface 212 of the first disc 202. The metallic trace 510 is defined by a plurality of shapes that may be positioned generally concentrically around the rotational axis 132. Each respective shape can increase in size along the length L of the metallic trace 510. Thus, varying the relative surface area of the metallic trace 510 along its length L. In some embodiments, the metallic trace 510 can be discontinuous such that a given shape is spaced apart from another, immediately adjacent shape. After rotating the first disc 202 relative to the second disc 204, a sensor (e.g., the one or more sensors 218A-218D) on the second disc 204 can detect the surface area of the metallic trace 510 positioned near or adjacent the sensor(s) (based, for example, on impedance, inductance, capacitance, dielectric constant, or other electrical or electromagnetic characteristics). For example, the sensor(s) can measure or detect a variance in an inductance, capacitance, resistance, or other electrical characteristic caused by the relative surface area of the metallic trace 510 at the location that is positioned adjacent or near the sensor. Although the shapes depicted in FIG. 7D are circular, any combination of shapes can be used to define the metallic trace 510. For example, the metallic trace 510 can be defined by a plurality of rectangles, triangles, ovals, squares, other geometric shapes, or a combinations thereof. Thus, as depicted in FIGS. 7A-7D, a characteristic of the metallic trace (e.g. width, radial position, or other physical, material, geometrical configuration or some combination thereof) may vary in a known manner as it extends along the disc.

The example embodiments of the metallic trace 210, 310, 410, 510 described above and shown in FIGS. 7A-E are for descriptive purposes and should not be viewed as limiting the scope of the disclosure. Moreover, these example embodiments should not be considered as the only possible embodiments. For example, one or more characteristics, features or aspects of an embodiment described herein can be combined with characteristics, features or aspects of another embodiment described herein.

While the position of the metallic trace 210 of the first disc 202 relative to the one or more sensors 218A-218D may be used to determine the rotational position of the knob 130, if the knob 130 (and, thus, the nut 170) is rotated beyond 360 degrees (i.e., more than one full revolution), the first disc 202 and one or more sensors 218A-218D may not recognize the number of full rotations or revolutions. If for example, the knob 130 and nut 170 are rotated 375 degrees (one full revolution plus an additional 15 degrees), then the sensors 218A-218D may determine that the first disc 202 is at 15 degrees (relative to the second disc 204) without accounting for the first 360 degrees of rotation.

Figure 7E:
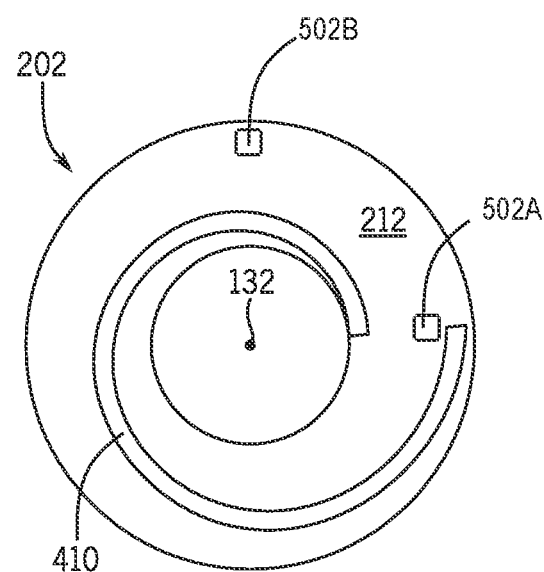

In some examples, one or more magnets can be disposed on or within the first disc 202. For example, as shown in FIG. 7E, the first disc 202 can include one or more magnets 502A, 502B disposed near the trace 410. While only a pair of magnets 502A, 502B are illustrated in FIG. 7E, a single magnet or a more than two magnets can be disposed on or within the first disc 202 in other examples. Moreover, the one or more magnets 502A, 502B can be disposed at any location on any surface of the first disc 202. For example, the magnet 502A can be affixed to a periphery or edge of the first disc 202. Alternatively, or additionally, the magnet 502A can be disposed nearer or closer to the rotational axis 132 than a periphery of the first disc 202. In some examples, two or more magnets 502A, 502B can be equidistantly spaced from one another on the first disc 202. In other examples, two or more magnets 502A, 502B can be grouped near one another on the first disc 202. The one or more magnets can be any size or shape capable of implementing the aspects disclosed herein.

In some examples, the one or more magnets 502A, 502B can be detected by one or more sensors (e.g., sensors 218A-218D) on the second disc 204 to enable calibration of the adjustment assembly 124. For example, the location of the magnet 502A on the first disc 202 can be correlated or associated with a particular rotational position of the first disc 202 relative to the second disc 204, such that, detection of the magnet 502A by one or more of the sensors 218A-218D is indicative of a known rotational position of the first disc 202. The known rotational position can be a rotational position between 0 degrees and 359 degrees. As such, a processor, controller, or other processing unit of the riflescope 100 can calibrate or otherwise determine the rotational position of the first disc 202 relative to the second disc 204 by detecting the one or more magnets 502A, 502B.

Additionally, or alternatively, the one or more magnets 502A, 502B can be detected by one or more sensors (e.g., sensors 218A-218D) on the second disc 204 to determine a number or amount of complete revolutions the adjustment assembly 124 has been rotated relative to the main tube 104. For example, the trace (e.g., trace 410) can be used to determine a partial rotation of the first disc 202 while a sensor detects a number of instances the magnet 502A is rotated past the sensor to determine the number or amount of complete rotations of the first disc 202 (i.e., rotation of the first disc 202 beyond 359 degrees, 719 degrees, 1079 degrees, 1439 degrees, etc.). As such, the number of complete rotations of the first disc 202 can be added or combined with the partial rotation determined using the trace (e.g., trace 410) to determine a value indicative of the total rotation of the adjustment assembly 124 relative to the main tube 104.

Additionally, or alternatively, one or more other components of the riflescope can be utilized to determine a total number of complete revolutions of the adjustment assembly 124. Referring back to FIGS. 4 and 6, one or more magnetic sensors 226A, 226B or magnetic field detector (e.g., a Hall Effect sensor or other magnetically sensitive transducer) may be used to detect a magnetic element 228 (e.g., a magnet or electromagnet). In one embodiment, the one or more sensors 226A, 226B may be coupled with the second disc 204 and the magnetic element 228 may be embedded in or otherwise associated with the actuator 160. The one or more magnetic sensors 226A, 226B or magnetic field detector may be configured to transduce a magnetic field emitted from the magnetic element 228. Changes in the magnetic field based on the linear (or axial) position of the actuator 160 along the rotational axis 132 (and, thus, the linear position of the magnetic element 228) may be detected by the one or more magnetic sensors 226A, 226B. The detected position of the actuator 160/magnetic element 228 may be used to determine a measurement of the axial position or displacement of the actuator 160 (as indicated by directional arrow 174) relative to the nut 170 and base 138 while the nut 170 rotates about the axis 132. Thus, the magnetic sensor 226 and magnetic element 228 may be used to measure movement of the actuator 160 and this information may be combined with that which is obtained relating to the rotational position of the first disc 202 (and its trace) relative to the second disc 204 (and its sensors 218).

For example, the one or more magnetic sensors 226A, 226B may detect, for example, the strength or orientation of the magnetic field of the magnetic element 228 in order to determine the relative positions of (e.g., the linear distance between) the one or more magnetic sensors 226A, 226B and the magnetic element 228. That linear distance may correspond with a number of full revolutions (or even partial revolutions) of the nut 170 since the number of revolutions may result in the actuator 160 (and magnetic element 228) moving a predetermined linear distance based on the threaded engagement between the actuator 160 and the coupler 162.

A full revolution of the nut 170 about its axis of rotation 132 may correspond to a specific linear displacement of the actuator 160 along the axis 132. For example, in one embodiment, the threads of the actuator 160 and coupler 162 may be sized and configured so that the actuator 160 translates along the axis 132 between about 0.5 mm and about 1.5 mm, between about 0.8 mm and about 1.2 mm, or about one millimeter (or some other predetermined distance) per revolution of the nut 170. Accordingly, the one or more magnetic sensors 226A, 226B may detect the number of complete revolutions of the nut 170 by measuring the distance of translation of the actuator 160 relative to the coupler 162 (i.e., the distance of translation of the magnetic element 228 along the axis 132 relative to the one or more magnetic sensors 226A, 226B), and the processor (not shown) may then convert the linear distance measured into a number of full revolutions of the nut 170 about the axis 132.

Thus, in some configurations, the first disc 202 and sensors 218 may be used as a measurement of the value of the angular position of the nut 170 offset from the zero point. This information may then be combined with the information obtained from the magnetic sensor 226 in order to obtain the absolute position of the nut 170 relative to the base 138 (i.e., the angular position of the nut 170 added to the number of full revolutions of the nut 170).

Such an embodiment may be used, for example, where the one or more magnetic sensors 226A, 226B and magnetic element 228 have a higher measurement error than do the first disc 202 (and trace) and the second disc 204 and sensors 218. Thus, the one or more magnetic sensors 226A, 226B and element 228 may be used to determine a first measured range of the angular position of the actuator 160 (e.g., between about 10 degrees to about 350 degrees of its true angular position), and the first disc 202 and sensors 218 may be used to determine the angular position of the actuator 160 relative to the zero point within a second measured range (e.g., within about 10 degrees or less of its true angular position), wherein the first measured range of the angular position has greater error or variance (i.e., has less accuracy)

than the second measured range of the angular position for values less than about 1 revolution of the nut 170.

Thus, in some embodiments, at least two measurement systems (e.g., one or more magnetic sensors 226A, 226B in association with magnetic element 228 and the first disc 202 in association with and the one or more sensors 218A-218D) may be implemented in the adjustment assembly 124, wherein one of the measurement systems (e.g., one or more magnetic sensors 226A, 226B and magnetic element 228) may be more accurate in measuring complete revolutions of the actuator 160, and the other measurement system (e.g., first disc 202 and the one or more sensors 218A-218D) may be more accurate in measuring partial revolutions of the nut 170. These two measurement systems may work together to detect the number of complete revolutions and the magnitude of a partial revolution in order to obtain the overall or absolute angular displacement of the nut 170.

Thus, a total or overall angular displacement of the erector tube 116 can be determined. Again, this total angular displacement value may be based on the angular displacement of the nut 170 about the axis 132 relative to the zero point as measured by rotation of the first disc 202 relative to the one or more sensors 218A-218D combined with the angular displacement or number of complete revolutions of the nut 170 about the axis 132 as measured by the one or more magnetic sensors 226A, 226B and magnetic element 228 which transduces linear displacement of the actuator 160 along the axis 132. For example, the number of complete revolutions may be converted to an angular displacement value (e.g., 360 degrees of rotation per complete revolution), and that value may be added to the angular displacement offset from the zero point (e.g., the angular displacement of the nut 170 that is less than one complete revolution) to obtain the total angular displacement of the nut 170. That total angular displacement may be displayed or otherwise made visible to the user. For instance, that value may be displayed using display system 154 based on a signal being sent to the controller. The display system 154 may display a number or other visual indicia representative of the rotational position of the nut 170 or adjustment assembly 124 (which may be displayed, for example, as an angular position in degrees, the number of "clicks," MOA, MIL or other appropriate values).

Thus, considering the example discussed above wherein the nut 170 has been rotated 375 degrees from an initial rotational position (e.g., a zero point), the one or more magnetic sensors 226A, 226B and a processor may determine that the nut 170 has made one complete revolution from the starting point, while the and one or more sensors 218A-218D may be used to measure the angular position or angular displacement of the first disc 202 relative to the second disc 204 (e.g. 15 degrees from the zero point). One or more processors disposed on the first disc 202, the second disc 202, or on another component of the riflescope may combine the information to determine the rotational position of the nut 170 to be at one full revolution plus 15 degrees, for a total rotation of 375 degrees. Similarly, the one or more processors may determine whether the nut 170 experiences multiple revolutions (e.g., two, three, or more) along with the angular position of the nut 170 relative to the zero point through any additional partial revolution.

While the traces (e.g., metallic traces 210, 310, 410, 510) shown in FIGS. 7A-7E are described as including metal, in some examples, each of the traces can consist of a non-metal material molded, adhered, or otherwise disposed on the first disc 202. For example, the first disc 202 can include a rubber or polymer trace (e.g., traces 210, 310, 410, 510) and the second disc 204 can include one or more electrical components which detect (e.g., using the one or more sensors 218A-218D) a change in dielectric constant caused by the rubber or polymer trace (e.g., traces 210, 310, 410, 510). While this example was described with reference to a rubber or polymer trace, examples including apertures or recesses forming the traces (e.g., traces 210, 310, 410, 510) in the first disc 204 can also, or alternatively, be implemented to determine the rotational position of the first disc 202 relative to the second disc 204. For example, any of the metallic traces 210, 310, 410, 510 shown in FIGS. 7A-7E can alternatively represent a cutout or recess formed in the first disc 202 that is detectable by electronic components disposed on or within the second disc 204 which detect (e.g., using the one or more sensors 218A-218D) a change in dielectric constant caused by the cutout or recessed trace. In other words, a dielectric constant or other electrical characteristic of the trace can be measured to determine the rotational position of the first disc 202 relative to the second disc 204.

Figure 8:
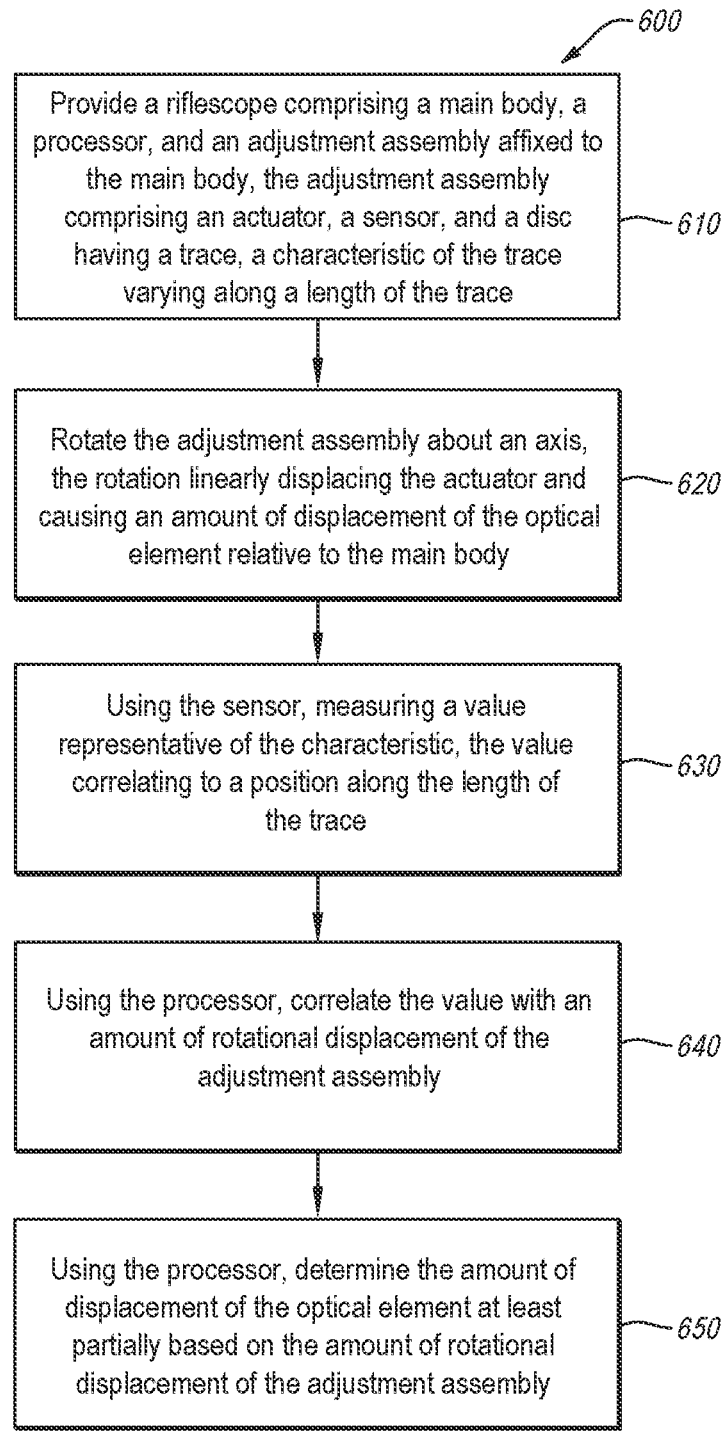
FIG. 8 shows a process flow diagram of a method for determining a displacement of an optical element of a riflescope.

Another aspect of the disclosure, illustrated in FIG. 8, relates to a method 600 for determining a displacement of an erector tube of a riflescope. The method 600 can have the step 610 of providing a riflescope comprising a main body, an optical element disposed within the main body, a processor, and an adjustment assembly affixed to the main body, the adjustment assembly comprising an actuator, a sensor, and a disc having a trace, a characteristic of the trace varying along a length of the trace. The method 600 can have the step 620 of rotating the adjustment assembly about an axis, the rotation linearly displacing the actuator and causing an amount of displacement of the optical element relative to the main body. The method 600 can have the step 630 of measuring, using the sensor, a value representative of the characteristic, the value correlating to a position along the length of the trace. The method 600 can have the step 640 of correlating, using the processor, the value with an amount of rotational displacement of the adjustment assembly. The method 600 can have the step 650 of determining, using the processor, the amount of displacement of the optical element at least partially based on the amount of rotational displacement of the adjustment assembly.

As shown in FIG. 8, the method 600 may comprise the step 610 of providing a riflescope (e.g., riflescope 100) having a main body (e.g., main tube 104) and an optical element (e.g., erector system 114 and/or its components) including the erector tube (e.g., 116). An adjustment assembly (e.g., at least one of the adjustment assemblies 124, 126, 128) can be coupled to the riflescope and configured to adjust or displace the optical element relative to the main body. The adjustment assembly may be configured to alter the position of the optical element within the main body by rotating, translating or otherwise displacing the optical element relative to the main body. Operation of the adjustment assembly may comprise rotating the adjustment assembly about an axis that extends through the adjustment assembly to effect adjustment of the optical element.

The method 600 can also include the step 620 of rotating the adjustment assembly about an axis, the rotation linearly displacing the actuator and causing an amount of displacement of the optical element relative to the main body. Rotation of the adjustment assembly may be determined by a processor and a disc including a trace. A width (or other characteristic) of the trace can be varied along a length of the trace as the trace extends along an arcuate path. The method 600 can also include the step 630 of measuring, using the sensor, a value representative of the characteristic. The value correlating to a position along the length of the trace. For example, determining the angular position of the disc may include measuring, with a first sensor or first set of sensors, one or more values representative of the width (or other characteristic) of the trace at a position along the length of the trace. The method may optionally include determining the number of complete revolutions of a knob (e.g., 130) about the axis (if any). This may be done using an additional sensor or an additional set of sensors configured to determine a linear or axial position of a component of the adjustment assembly along the rotational axis (e.g., 132).

The method can include the step 640 of using the processor to correlate the value with an amount of rotational displacement of the adjustment assembly. In some examples, the processor can correlate multiple values with rotational displacement of the adjustment assembly. For example, the processor can combine or correlate a first determined value (i.e., the value representative of the width (or other characteristic) of the trace at the detected position) with a second determined value (i.e., the value associated with the linear or axial position of a component of the adjustment assembly). This combination may effectually be used in step 650 to determine a total angular or rotational displacement of a rotational component (of the adjustment assembly) about the axis relative to a zero point. The total angular or rotational displacement of the rotational component can correlate to angular displacement of an erector tube (e.g., 116). The disc, sensor, and processor may be embodied by the disc, sensor, and processor described elsewhere herein.

The method may also include displaying a total angular rotation of the adjustment assembly to a user of the riflescope. For example, the total angular rotation may be displayed on a counter or a screen. In one embodiment, the processor may communicate the adjusted position information to the control module 152 which may provide the information to the display system 154. Thus, a user may read the rotational position of an adjustment assembly without having to remove their eye from the view provided by the riflescope 100 to look at the markings on the knob of a given adjustment assembly.

It is noted that embodiments such as described above provide an advantage in being able to determine the absolute or total rotational position of the adjustment assembly (e.g., the nut 170 and knob 130) including the number of full revolutions. Further, such is accomplished in a device that is relatively small and capable of fitting in a limited space, such as an annulus defined between the nut and the knob or housing of the adjustment assembly.

It is further noted that the aspects described herein may be used with other types of riflescopes and with adjustment assemblies of other designs. Some nonlimiting examples of other riflescopes and other adjustment assemblies are described in the previously incorporated U.S. Patent documents.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes all modifications, equivalents, and alternatives falling within the spirit and scope of the invention as defined by the following appended claims.

What is claimed is:

1. An adjustment assembly for a riflescope, the assembly comprising:
   a knob defining a central axis and rotatable about the central axis;
   a disc having a trace, a characteristic of the trace varying along a length of the trace;
   a first sensor configured to measure a value representative of the characteristic of the trace at a position along the length of the trace; and
   a second sensor configured to detect complete revolutions of the knob about the central axis; and
   a processor configured to:
      correlate the value representative of the characteristic of the trace at the position with a partial revolution of the knob about the central axis relative to a zero point; and
      determine a displacement of an erector tube within the riflescope based on the complete revolutions and the partial revolution.

2. The adjustment assembly of claim 1 further comprising a linear actuator translatable along the central axis in response to rotation of the knob, wherein the second sensor detects a displacement of the linear actuator to detect the complete revolutions of the knob about the central axis.

3. The adjustment assembly of claim 2, wherein the linear actuator includes a magnet and the second sensor comprises a magnetic sensor.

4. The adjustment assembly of claim 1, wherein the disc is coupled to the knob such that the disc rotates with the knob about the central axis.

5. The adjustment assembly of claim 1, wherein the first sensor is coupled to the knob such that the first sensor rotates with the knob about the central axis.

6. The adjustment assembly of claim 1, wherein the value representative of the characteristic of the trace at the position is related to a detected change in an inductance, capacitance, or dielectric constant measured by the first sensor.

7. The adjustment assembly of claim 1, further comprising a third sensor configured to measure a second value representative of the width of the trace at a second position along the length of the trace, wherein the processor is configured to correlate the value and the second value with the angular displacement of the knob about the central axis relative to the zero point.

8. The adjustment assembly of claim 1, wherein the first sensor is configured to sense an angular displacement that is less than one revolution relative to the zero point.

9. The adjustment assembly of claim 1, wherein the trace extends continuously around the central axis.

10. The adjustment assembly of claim 1, wherein the characteristic of the trace is a width of the trace at the position.

11. A riflescope, comprising:
    an enclosure defining an internal volume;
    an erector tube pivotably disposed within the internal volume;
    a processor;
    an adjustment assembly operable to displace the erector tube within the enclosure, the adjustment assembly defining a central axis and comprising:
       a knob rotatable about the central axis;
       a disc having a trace, a characteristic of the trace varying along a length of the trace;
       a first sensor configured to measure a value representative of the characteristic of the trace at a position along the length of the trace; and
       a second sensor configured to detect complete revolutions of the knob about the central axis; and
    wherein the processor is configured to:

correlate the value representative of the characteristic of the trace at the position with a partial revolution of the knob about the central axis relative to a zero point; and determine a displacement of the erector tube within the enclosure based on the complete revolutions and the partial revolution.

12. The riflescope of claim 11, wherein the second sensor is a magnetic sensor configured to detect a displacement of a magnet disposed on the disc to detect the complete revolutions of the knob about the central axis.

13. The riflescope of claim 11, wherein the disc is coupled to the knob such that the disc rotates with the knob about the central axis.

14. The riflescope of claim 11, wherein the first sensor is coupled to the knob such that the first sensor rotates with the knob about the central axis.

15. The riflescope of claim 11, wherein the value representative of the characteristic of the trace at the position is related to a detected change in an inductance, capacitance, or dielectric constant measured by the first sensor.

16. The riflescope of claim 11, wherein the adjustment assembly further comprises a third sensor configured to measure a second value representative of the characteristic of the trace at a second position along the length of the trace, wherein the processor is configured to correlate the first and second values with an angular displacement of the knob about the central axis relative to the zero point.

17. The riflescope of claim 11, wherein the trace extends continuously around the central axis.

18. The riflescope of claim 11, wherein the characteristic of the trace is a width of the trace at the position.

19. The riflescope of claim 11, wherein the characteristic of the trace is a radial position of the trace, relative to the central axis, at the position.

20. A method for determining a displacement of an optical element of a riflescope, the method comprising:

providing a riflescope comprising a main body, an optical element disposed within the main body, a processor, and an adjustment assembly affixed to the main body, the adjustment assembly comprising an actuator, a sensor, and a disc having a trace, a characteristic of the trace varying along a length of the trace;

rotating the adjustment assembly about an axis, the rotation linearly displacing the actuator and causing an amount of displacement of the optical element relative to the main body;

measuring, using the sensor, a value representative of the characteristic, the value correlating to a position along the length of the trace;

correlating, using the processor, the value with an amount of rotational displacement of the adjustment assembly; and determining, using the processor, the amount of displacement of the optical element at least partially based on the amount of rotational displacement of the adjustment assembly.

* * * * *